(12) United States Patent
Kourogi et al.

(10) Patent No.: US 9,008,996 B2
(45) Date of Patent: Apr. 14, 2015

(54) MOVING BODY POSITIONING DEVICE

(75) Inventors: Masakatsu Kourogi, Tsukuba (JP); Takeshi Kurata, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 330 days.

(21) Appl. No.: 13/001,275

(22) PCT Filed: Jul. 2, 2009

(86) PCT No.: PCT/JP2009/062142
§ 371 (c)(1),
(2), (4) Date: Dec. 23, 2010

(87) PCT Pub. No.: WO2010/001968
PCT Pub. Date: Jan. 7, 2010

(65) Prior Publication Data
US 2011/0106487 A1 May 5, 2011

(30) Foreign Application Priority Data

Jul. 2, 2008 (JP) ................................. 2008-173970

(51) Int. Cl.
*G01C 21/28* (2006.01)
*G01C 21/26* (2006.01)
(Continued)

(52) U.S. Cl.
CPC ............... *G01C 21/26* (2013.01); *G01C 21/16* (2013.01); *G01C 19/00* (2013.01); *G01C 21/00* (2013.01); *G01C 21/28* (2013.01); *G01C 22/00* (2013.01); *G08G 1/005* (2013.01)

(58) Field of Classification Search
CPC ................................. G01C 21/16; G01C 21/14
USPC ........................................................ 702/142
See application file for complete search history.

(56) References Cited

U.S. PATENT DOCUMENTS 6,415,229 B1 * 7/2002 Diekhans ...................... 701/470
6,480,148 B1 11/2002 Wilson et al.
(Continued)

FOREIGN PATENT DOCUMENTS

JP 5-306936 A 11/1993
JP 08-068652 A 3/1996
(Continued)

OTHER PUBLICATIONS

Faruqi, F., Non-linear mathematical model for integrated global positioning/intertial navigation systems, Applied Mathematics and Computation 115 (2000), pp. 191-212.*
(Continued)

*Primary Examiner* — John Breene
*Assistant Examiner* — Timothy H Hwang
(74) *Attorney, Agent, or Firm* — Renner, Otto, Boisselle & Sklar, LLP

(57) ABSTRACT

In order to acquire positioning results (position and azimuth) of a moving body and reducing cumulative errors in integration processing of the positioning results, a moving body positioning apparatus includes: movement detecting means for detecting whether or not a moving body is moving; position acquiring means for acquiring a position of the moving body; integrating means for integrally processing a plurality of positions acquired by the position acquiring means as positioning results; and preprocessing means for preprocessing the positioning results to be inputted into the integrating means. In accordance with output from the movement detecting means, the preprocessing means inputs the positioning results obtained from the position acquiring means into the integrating means, which integrally processes the positioning results.

11 Claims, 14 Drawing Sheets

(51) Int. Cl.
    *G01C 19/00*    (2013.01)
    *G01C 21/00*    (2006.01)
    *G01C 22/00*    (2006.01)
    *G01C 21/16*    (2006.01)
    *G08G 1/005*    (2006.01)

(56) References Cited

U.S. PATENT DOCUMENTS

| | | | |
|---|---|---|---|
| 6,636,826 | B1 | 10/2003 | Abe et al. |
| 7,089,148 | B1 | 8/2006 | Bachmann et al. |
| 7,363,147 | B2 | 4/2008 | Esaki et al. |
| 2002/0143491 | A1* | 10/2002 | Scherzinger ............... 702/160 |
| 2003/0018430 | A1* | 1/2003 | Ladetto et al. ............. 701/217 |
| 2005/0240347 | A1 | 10/2005 | Yang |
| 2006/0247854 | A1 | 11/2006 | Esaki et al. |
| 2007/0032951 | A1 | 2/2007 | Tanenhaus et al. |
| 2007/0250261 | A1* | 10/2007 | Soehren .................. 701/207 |
| 2008/0004796 | A1* | 1/2008 | Schott et al. ............... 701/201 |
| 2008/0221818 | A1* | 9/2008 | Tan et al. .................. 702/87 |
| 2008/0262728 | A1* | 10/2008 | Lokshin et al. ............ 701/216 |
| 2009/0015399 | A1 | 1/2009 | Burneske et al. |
| 2010/0198442 | A1* | 8/2010 | Appelman et al. ............ 701/25 |

FOREIGN PATENT DOCUMENTS

| | | |
|---|---|---|
| JP | 08-285621 | 11/1996 |
| JP | 09-005093 | 1/1997 |
| JP | 11-211479 | 8/1999 |
| JP | 3038452 | 3/2000 |
| JP | 2000-180171 | 6/2000 |
| JP | 2002-213979 | 7/2002 |
| JP | 2002286829 A * | 10/2002 |
| JP | 2005-114537 | 4/2005 |
| JP | 2006-329972 | 12/2006 |
| WO | 98/49577 | 11/1998 |
| WO | WO 2005109215 A2 * | 11/2005 |

OTHER PUBLICATIONS

International Search Report for corresponding International Application No. PCT/JP2009/062142 mailed Sep. 29, 2009.

PCT/ISA/237 for corresponding International Application No. PCT/JP2009/062142 dated Sep. 29, 2009.

Co-pending U.S. Appl. No. 13/001,483, filed Dec. 27, 2010 (application provided).

International Search Report for International Application No. PCT/JP2009/062145 mailed Sep. 29, 2009.

PCT/ISA/237 for International Application No. PCT/JP2009/062145 dated Sep. 29, 2009.

Office Action for corresponding U.S. Appl. No. 13/001,483 dated Apr. 19, 2013.

Office Action in co-pending U.S. Appl. No. 13/001,483 dated Nov. 5, 2013.

* cited by examiner

MOVING BODY POSITIONING DEVICE

TECHNICAL FIELD

The present invention relates to a moving body positioning apparatus capable of measuring the position and azimuth of a moving body and reducing cumulative errors in integrally processing the positioning results thus acquired.

BACKGROUND ART

A technique for acquiring the position and azimuth of a person through a body-worn system in which the person wears an electronic system containing a sensor is essential to the realization of an intellectual interface with a computer through a grasp of context information on the person. Such a technique is expected to be developed to have many applications in pedestrian navigation, grasping of the situation of workers during remote operation assistance, guiding of visitors thorough exhibitions in museums or large-scale exhibition facilities, etc.

Moreover, various extended techniques have brought about improvement in positioning accuracy of the GPS (Global Positioning System). However, depending on the line-of-sight distance of GPS satellites and multipath errors, the extended techniques cannot give sufficient accuracy and, what is more, face difficulties in being used in indoor environments. A car navigation system, which is a moving body positioning apparatus, uses radio signals from GPS satellites to measure the position of a vehicle in which the system has been installed and, furthermore, uses a vehicle speed sensor, a gyro sensor, etc. to estimate the current position of the vehicle while accumulating distances and directions the vehicle has traveled.

In a situation where the car navigation system cannot receive radio signals from GPS satellites, errors contained in positioning according to autonomous navigation are amplified over time; therefore, there is a gradual decrease in accuracy of position. For this reason, there have been proposed various methods, as disclosed in Patent Literature 1, for correcting the position of a vehicle positioned by autonomous navigation. For example, map matching is carried out, using map data stored in a navigation system, to correct a position measured by autonomous navigation (Patent Literature 1).

CITATION LIST

Patent Literature 1
Japanese Patent Application Publication, Tokukai, No. 2002-213979 A

SUMMARY OF INVENTION

Technical Problem

When, in a moving body positioning apparatus, a series of position measurement results is obtained through positioning means using radio signals such as a wireless IC tag or the GPS, an infrared beacon device, a motion analysis by external camera, etc., highly reproducible positioning results are often repeatedly obtained, as long as a moving body is present at the same point.

However, errors in the positioning results are often not deemed as white noise whose mean vector is zero, and the errors are often accompanied by offsets depending on places of positioning. For the purpose of position estimation processing, it is desirable that input into a Kalman filter, a particle filter, etc. assume character of an error having a quality of white noise whose mean is zero. However, in such a situation as mentioned above, continuous input of the positioning results as observations into a Kalman filter, a particle filter, etc. ends up in inaccurate positioning results displaced by the offset errors.

Alternatively, in an absolute azimuth acquisition apparatus for acquiring the absolute azimuth of a moving body with reference to geomagnetism, a highly reproducible absolute azimuth is often repeatedly acquired, as long as the moving body is present at the same point. However, if the absolute azimuth is out of alignment with true magnetic north, for example, due to the presence of a magnetic body nearby, such an error cannot be deemed as white noise whose means is zero. Therefore, it is inappropriate, by the same token, to integrate positioning results by inputting them into a Kalman filter, a particle filter, etc.

The present invention has been made in order to solve such problems, and it is an object of the present invention to provide a moving body positioning apparatus capable of acquiring positioning results (position and azimuth) of a moving body and reducing cumulative errors in integrally processing the positioning results.

Solution to Problem

In order to attain such an object as stated above, the present invention configures a moving body positioning apparatus based on such a concept as follows: Because positioning results obtained by a wireless IC tag, the GPS, etc. in an interval of movement over a distance longer than or equal to a predetermined threshold value are not those obtained at the same point but those obtained in moment-to-moment varying conditions and environments, errors in observation data are expected to be closer in character to a quality of white noise whose mean vector is 0. For this reason, a series of positioning results that are obtained during movement is considered as data more appropriate in character to be input into a Kalman filter, a particle filter, etc.

In view of this, the present invention makes it possible to measure the position of a moving body more appropriately by detecting movements to discriminate between two states, namely a state where the moving body is moving and a state where the moving body is at rest, and by differently dealing with positioning results obtained in the respective states.

Further, in cases where the moving body positioning apparatus of the present invention makes absolute azimuth measurements, absolute azimuth measurement results obtained according to geomagnetism in an interval of movement over a distance longer than or equal to a predetermined threshold value are not those obtained at the same point but those obtained in moment-to-moment varying conditions and environments. Therefore, errors in observation data are expected to be closer in character to a quality of white noise whose mean vector is 0. For this reason, a series of absolute azimuth measurement results that are obtained during movement serves as data more appropriate in character to be inputted into a Kalman filter, a particle filter, etc. for integrated processing. In view of this, the present invention makes it possible to measure the absolute azimuth of a moving body more appropriately by detecting movements to discriminate between two states, namely a state where the moving body is moving and a state where the moving body is at rest, and by differently dealing with absolute azimuth measurement results obtained according to geomagnetic in the respective states.

Specifically, in a first aspect of the present invention, a moving body positioning apparatus includes: movement detecting means for detecting whether or not a moving body is moving; position acquiring means for acquiring a position of the moving body; integrating means (which may be a processor) for integrally processing a plurality of positions acquired by the position acquiring means as positioning results; and preprocessing means (which may be the same or a different processor) for preprocessing positioning results that are to be inputted into the integrating means, in accordance with output from the movement detecting means, the preprocessing means inputting positioning results obtained from the position acquiring means into the integrating means, which integrally processes the positioning results.

Further, in a second aspect of the present invention, a moving body positioning apparatus includes: movement speed measuring means for measuring a movement speed of a moving body; position acquiring means for acquiring a position of the moving body; integrating means for integrally processing a plurality of positions acquired by the position acquiring means as positioning results; and preprocessing means for preprocessing positioning results that are to be inputted into the integrating means, in accordance with output from the movement speed measuring means, the preprocessing means inputting positioning results obtained from the position acquiring means into the integrating means, which integrally processes the positioning results.

Further, in a third aspect of the present invention, a moving body positioning apparatus includes: movement speed measuring means for measuring a movement speed of a moving body; position acquiring means for acquiring a position of the moving body; integrating means for integrally processing a plurality of positioning results acquired by the position acquiring means and results of measurement of the movement speed by the movement speed measuring means; and preprocessing means for preprocessing positioning results that are to be inputted into the integrating means, in accordance with output from the movement speed measuring means, the preprocessing means inputting positioning results obtained from the position acquiring means into the integrating means, which integrally processes the positioning results.

Further, in a fourth aspect of the present invention, a moving body positioning apparatus includes: travel distance measuring means for measuring a travel distance that a moving body has traveled; integrating means for integrally processing a plurality of positions acquired by the position acquiring means as positioning results; and preprocessing means for preprocessing positioning results that are to be inputted into the integrating means, in accordance with output from the travel distance measuring means, the preprocessing means inputting positioning results obtained from the position acquiring means into the integrating means, which integrally processes the positioning results.

Further, in a fifth aspect of the present invention, a moving body positioning apparatus includes: movement detection means for detecting whether or not a moving body is moving; absolute azimuth acquiring means for acquiring an absolute azimuth of the moving body; integrating means for integrally processing azimuth estimate results estimated from a plurality of absolute azimuths acquired by the absolute azimuth acquiring means as positioning results; and preprocessing means for preprocessing positioning results that are to be inputted into the integrating means, in accordance with output from the movement detecting means, the preprocessing means inputting absolute azimuth estimate results obtained from the absolute azimuth acquiring means into the integrating means, which integrally processes the azimuth estimate results.

Further, in a sixth aspect of the present invention, a moving body positioning apparatus includes: movement speed measuring means for measuring a movement speed of a moving body; absolute azimuth acquiring means for acquiring an absolute azimuth of the moving body; integrating means for integrally processing azimuth estimate results estimated from a plurality of absolute azimuths acquired by the absolute azimuth acquiring means as positioning results; and preprocessing means for preprocessing positioning results that are to be inputted into the integrating means, in accordance with output from the movement speed measuring means, the preprocessing means inputting absolute azimuth estimate results obtained from the absolute azimuth acquiring means into the integrating means, which integrally processes the azimuth estimate results.

Further, in a seventh aspect of the present invention, a moving body positioning apparatus includes: travel distance measuring means for measuring a travel distance that a moving body has traveled; absolute azimuth acquiring means for acquiring an absolute azimuth of the moving body; integrating means for integrally processing azimuth estimate results estimated from a plurality of absolute azimuths acquired by the absolute azimuth acquiring means as positioning results; and preprocessing means for preprocessing positioning results that are to be inputted into the integrating means, in accordance with output from the travel distance measuring means, the preprocessing means inputting absolute azimuth estimate results obtained from the absolute azimuth acquiring means into the integrating means, which integrally processes the azimuth estimate results.

In these cases, position information acquired by the position acquiring means is position information that is not guaranteed to assume character of an error having a quality of white noise whose mean vector is zero, and azimuth information acquired by the absolute azimuth acquiring means is azimuth information that is not guaranteed to assume character of an error having a quality of white noise whose mean vector is zero.

Advantageous Effects of Invention

A moving body positioning apparatus of the present invention can detect whether or not a moving body is moving, select, in accordance whether or not the moving body is moving, data whose positions and azimuths are to be corrected as positioning results of the moving body, and process the data.

When, in a moving body positioning apparatus, positioning results of a moving body as obtained by a wireless IC tag or the GPS for use in acquisition of an absolute position, an infrared beacon device, a motion analysis by external camera, etc. are inputted into a Kalman filter, a particle filter, etc., the data to be inputted can be appropriately selected. When absolute azimuth estimate results obtained according to geomagnetism are inputted into a Kalman filter, a particle filter, etc., the data to be inputted can be appropriately selected particularly effectively.

This makes it possible, as a result, to select, from a series of data on positioning results, obtained by a wireless IC tag or the GPS, which do not assume character of an error having a quality of white nose whose mean vector is zero, appropriate data that can be inputted into a Kalman filter or a particle filter, and to input the positioning results for integrated processing.

This also makes it possible to select, from a series of data on positioning results, obtained according to geomagnetism, which do not assume character of an error having a quality of white nose whose mean vector is zero, appropriate data that can be inputted into a Kalman filter or a particle filter, and to input the positioning results for integrated processing.

DESCRIPTION OF EMBODIMENTS

Figure 1:
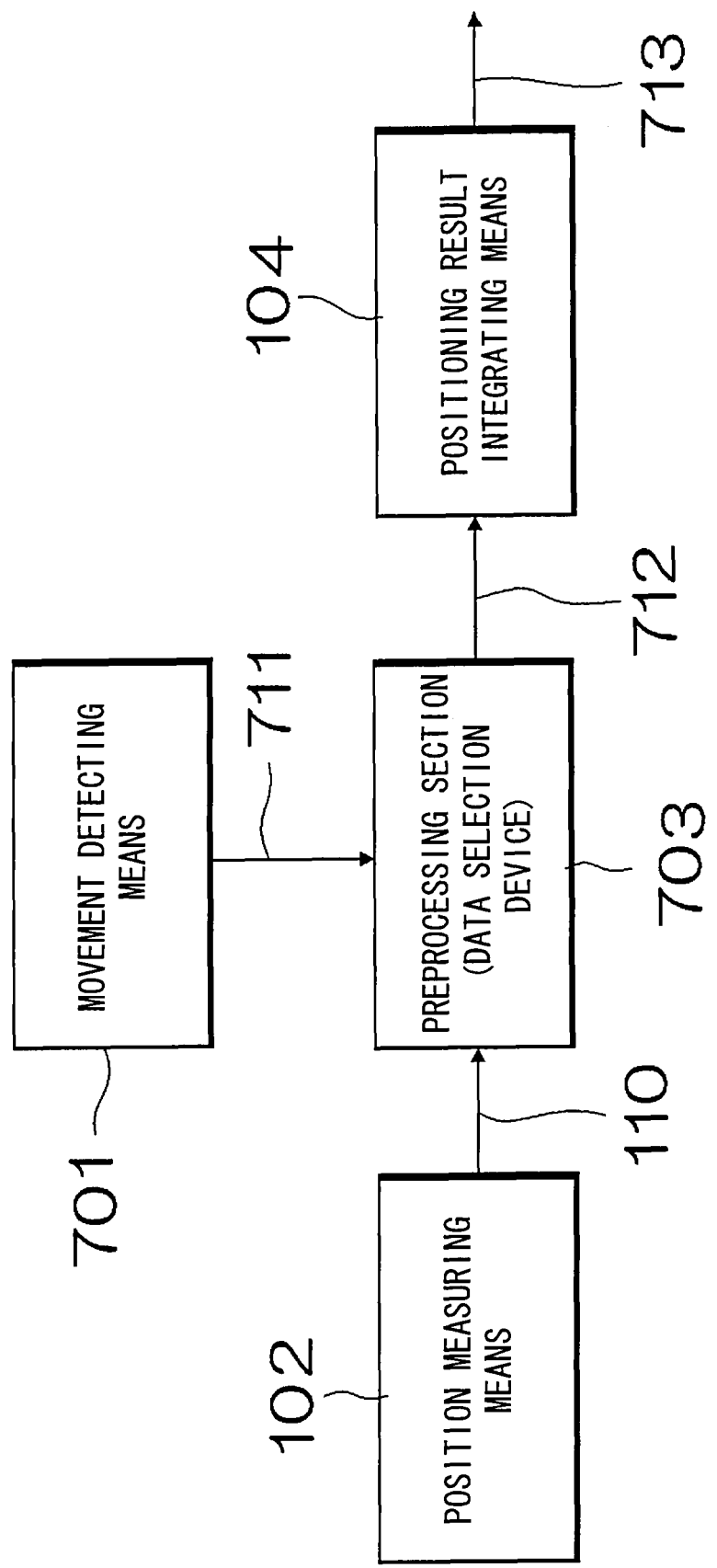
FIG. 1 is a block diagram showing a basic configuration of a moving body positioning apparatus according to the present invention.

A moving body positioning apparatus according to an embodiment of the present invention is described below in detail with reference to the drawings. FIG. 1 is a block diagram showing a basic configuration of a moving body positioning apparatus according to the present invention. In FIG. 1, reference numerals 102, 104, 701, and 703 indicate position measuring means, positioning result integrating means, movement detecting means, and a preprocessing section, respectively. Reference numerals 110, 711, 712, and 713 indicate position information, a movement detection signal, a preprocessing signal outputted by the preprocessing section, and an integrated signal of positioning results, respectively.

The movement detecting means 701 is a measuring device that is mounted to a moving body to detect whether or not the moving body is moving. Alternatively, the movement detecting means 710 is a measuring device that observes a moving body from outside to detect whether or not the moving body is moving. When the moving body is moving, the movement detecting means 701 outputs a movement detection signal 711 whose movement flag is TRUE. Alternatively when the moving body is at rest, the movement detecting means 701 outputs a movement detection signal 711 whose movement flag is FALSE. In cases where the moving body is an automobile or a mobile robot, the movement detecting means 701 is embodied, for example, by a wheel rotary encoder or a car speed pulse (odometer) generator. Alternatively, in cases where the moving body is a pedestrian, the movement detecting means 701 is embodied by an acceleration sensor that detects the walking movement of the pedestrian, a pedometer, etc.

Alternatively, the movement detecting means 701 can also be embodied by a device that detects the status of movement by using a computer to analyze an image taken by an external camera monitoring a moving body. Alternatively, the movement detecting means 701 can also be embodied by an inertial navigation system (INS), combined with an inertial sensor, which can be applied to any moving body.

The position measuring means 102 is measuring means that either is mounted to a moving body or observes a moving body from outside to measure the position of the moving body. The position measuring means 102 is embodied, for example, by a position detection device such as the GPS or a wireless IC tag, an inertial navigation system (INS), a dead-reckoning device based on walking movement, etc. Alternatively, the position measuring means 102 can also be constituted by a data-processing device that estimates the position of a moving body through observation by external camera.

The position measuring means 102 measures the current position of the moving body and outputs position information 110 thus measured. Such position information 110 outputted by the position measuring means 102 may contain the uncertainty of the position information. The preprocessing section 703 determines, with reference to a movement detection signal 711 obtained as a result of detection of whether or not the moving body is moving, whether position information 110 obtained as a positioning result of the moving body should be used, and outputs appropriate position information.

The preprocessing section 703 mainly executes a data selection process on a processor. When it is determined that the moving body is at rest, i.e., when a movement detection signal 711 obtained a result of detection of whether or not the moving body is moving is outputted as a FALSE signal, the preprocessing section 703 carries out a process of skipping second and subsequent pieces of data on position information 110 obtained from the position measuring means 102 as positioning results.

That is, even if plural pieces of position information 110 are obtained as positioning results observed when the moving body was at rest, the preprocessing section 703 selects one of them as a representative, and outputs it when a movement detection signal 711 obtained as a result of detection of whether or not the moving body is moving is outputted as TRUE. When the pieces of position information 110 obtained contain information about uncertainty, the preprocessing section 703 may take out position information with the least uncertainty during the data selection process.

In this way, only position information selected by the preprocessing section 703 is outputted as a preprocessing signal 712. The positioning result integrating means 104 integrates a plurality of positioning results obtained from the position measuring means 102 as positioning results of the moving body into one final positioning result and outputs it as an integrated signal 713.

In this case, position information 110 obtained from the position measuring means 102 as a plurality of positioning results is that which is obtained, for example, by a positioning device based on the GPS, a wireless IC tag, or infrared signal beacons, an inertial navigation system (INS), a dead-reckoning device based on walking movement, a device for motion analysis by external camera, etc. The positioning result integrating means 104, which integrates these positioning results, carries out a process of integrating positioning results, for example, through a Kalman filter, a particle filter, etc. These processes are publicly known, and as such, are not described in detail.

The positioning result integrating means 104 receives, as a preprocessing signal 712, position information 110 selected by the preprocessing section 712 as a positioning result. The positioning result integrating means 104 incorporates the preprocessing signal 712 as input, updates its internal positioning result, and, by using the result as position information, outputs a final positioning result as an integrated signal 713. In cases where the positioning result integrating means 104 is embodied by a Kalman filter, a particle filter, etc. on a processor, the integrated signal 713, i.e., the final positioning result may be output containing uncertainty about the position.

Figure 2:
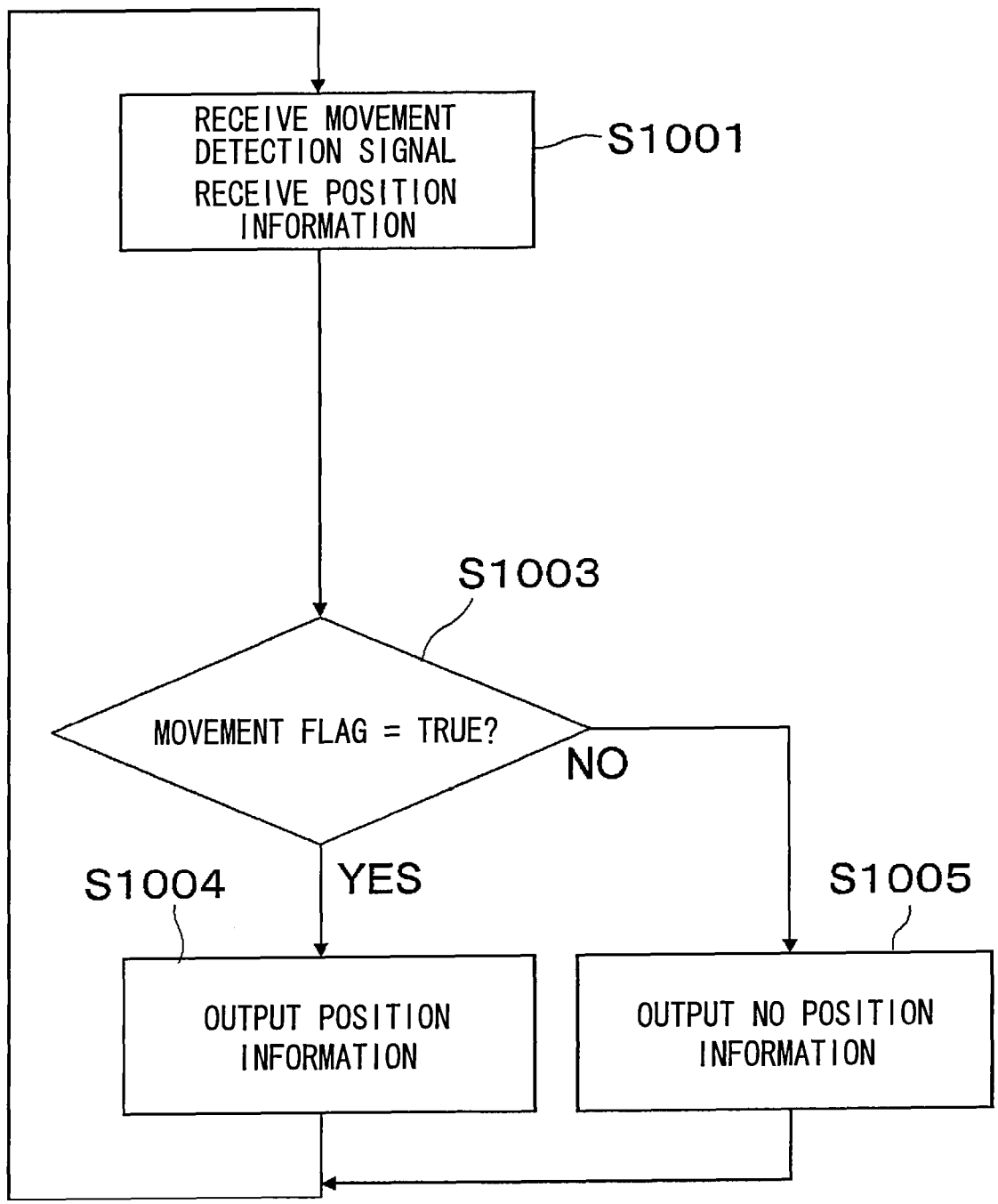
FIG. 2 is a flow chart showing the content of data processing in a preprocessing section 703.

FIG. 2 is a flow chart showing the content of data processing in the preprocessing section 703. An explanation is given with reference to FIG. 2. When the process is started, first, in Step S1001, the preprocessing section 703 receives from the movement detecting means 701 a movement detection signal 711 representing whether or not a moving body is moving and receives position information 110 on the moving body from the position measuring means 102. In Step S1001, the position information 110 thus received is accumulated in a storage device for future use. Next, in Step S1003, the preprocessing section 703 determines whether or not the movement detection signal 711 has a TRUE movement flag. If the movement detection signal 711 has a TRUE movement flag, the preprocessing section 703 executes Step S1004. Alternatively, if the movement detection signal 711 has a FALSE movement flag, the preprocessing section 703 executes Step S1005.

In Step S1004, if position information 110 obtained from the position measuring means 102 contains information about uncertainty, position information 713 with the least uncertainty is outputted. When the movement detection signal 711 has a FALSE movement flag, Step S1005 is executed. In Step S1005, no position information is outputted, that is, information indicative of the absence of output is presented. The process returns to Step S1001 to start all over again from Step S1001.

Figure 3:
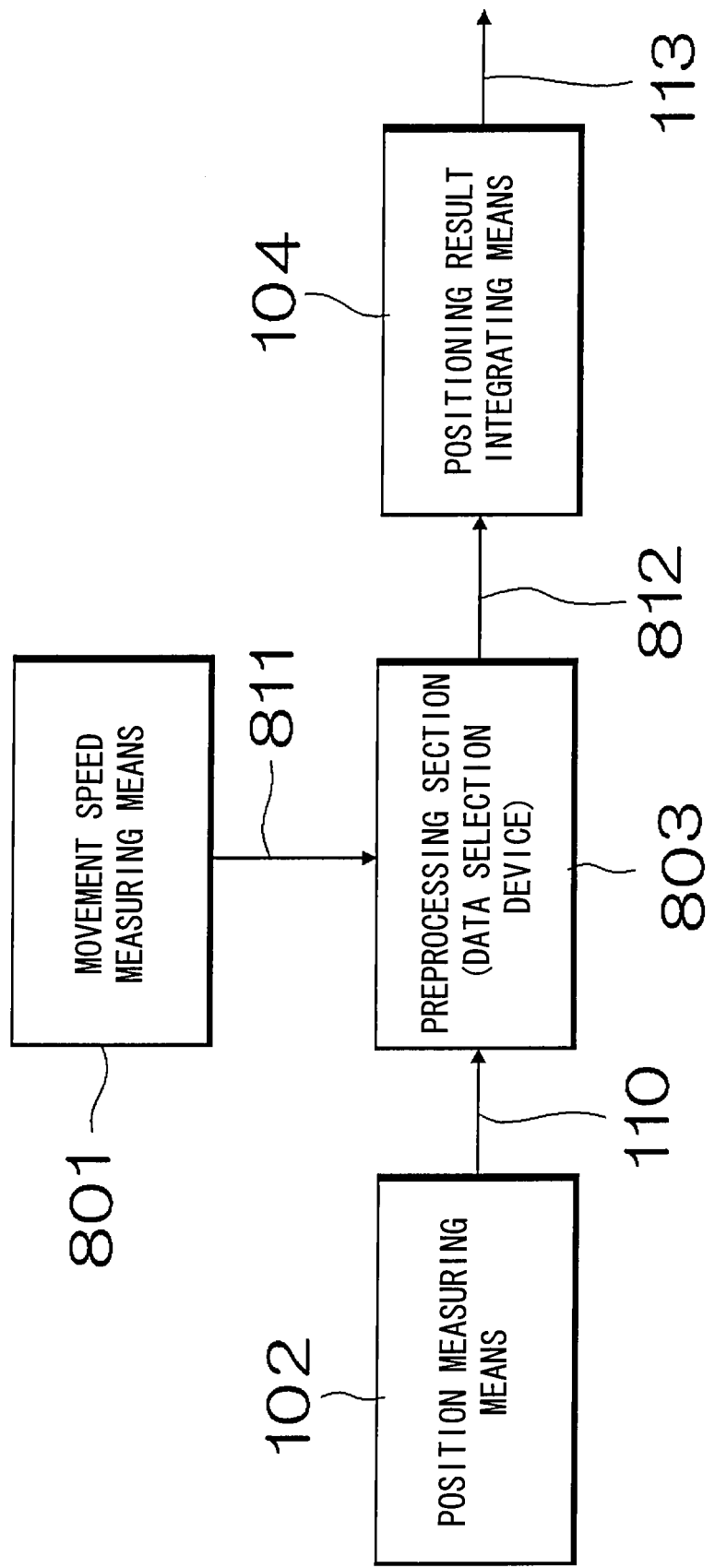
FIG. 3 is a block diagram showing a configuration of another moving body positioning apparatus according to the present invention.

FIG. 3 is a block diagram showing a configuration of another moving body positioning apparatus according to the present invention. In FIG. 3, reference numerals 102, 104, 801, and 803 indicate position measuring means, positioning result integrating means, movement speed measuring means, and a preprocessing section, respectively. Reference numerals 110, 811, 812, and 113 indicate position information, movement speed information, a preprocessing signal outputted by the preprocessing section, and an integrated signal of positioning results, respectively.

In the block diagram of FIG. 3, the moving body positioning apparatus includes movement speed measuring means 801 for measuring the movement speed of a moving body, instead of including movement detecting means. The movement speed measuring means 801 is a device that either is mounted to a moving body or uses external observation means to measure the speed of the moving body and output movement speed information 811. In cases where the moving body is an automobile or a mobile robot, the movement speed measuring means 801 is constituted using a wheel rotary encoder or a car speed pulse (odometer). Alternatively, in cases where the moving body is a pedestrian, the movement speed measuring means 801 is constituted using an acceleration sensor that detects the walking movement of the pedestrian.

Alternatively, the movement speed measuring means 801 can also be embodied by a device that measures the movement speed of a moving body by analyzing an image taken by a camera installed outside to monitor the moving body. Alternatively, the movement speed measuring means 801 can principally measure the movement speed of any moving body by using an inertial navigation system (INS).

The position measuring means 102 is measuring means that either is mounted to a moving body or observes a moving body from outside to measure the position of the moving body. As mentioned above, the position measuring means 102 is embodied, for example, by a position detection device such as the GPS or a wireless IC tag, an inertial navigation system (INS), a dead-reckoning device based on walking movement, etc. Alternatively, the position measuring means 102 can also be constituted by a data-processing device that estimates the position of a moving body through observation by external camera. The position measuring means 102 measures the position of the moving body and outputs position information 110 on the moving body. Such position information 110 thus outputted may contain the uncertainty of the position information.

The preprocessing section 803 carries out preprocessing mainly as a data selection process. In this case, the preprocessing section 803 receives movement speed information 811 from the movement speed measuring means 801, calculates in accordance with the movement speed information 811 a travel distance that the moving body has traveled, and selects from data on positioning results from the position measuring means 102 in accordance with the travel distance thus calculated.

That is, in an initial state where the preprocessing section 803 has not outputted position information 110 at all by receiving position information 110 from the position measuring means 102, the preprocessing section 803 outputs the received position information 110 as its preprocessing signal 812. In cases where the preprocessing section 803 outputted position information 110 in the past, the preprocessing section 803 calculates a travel distance from a movement speed signal 811 and, furthermore, calculates a distance that the moving body has traveled since the last output, in which case if the distance thus calculated is less than or equal to a predetermined threshold value, the preprocessing section 803 selects one of the pieces of previously received position information 110 as a representative value and outputs it as a preprocessing signal 812.

In cases where the pieces of position information 110 contain uncertainties, the preprocessing section 803 outputs position information 110 with the least uncertainty as a preprocessing signal 812. As mentioned above, the positioning result integrating means 104 integrates a plurality of positioning results of the moving body into one final positioning result and outputs it.

Figure 4:
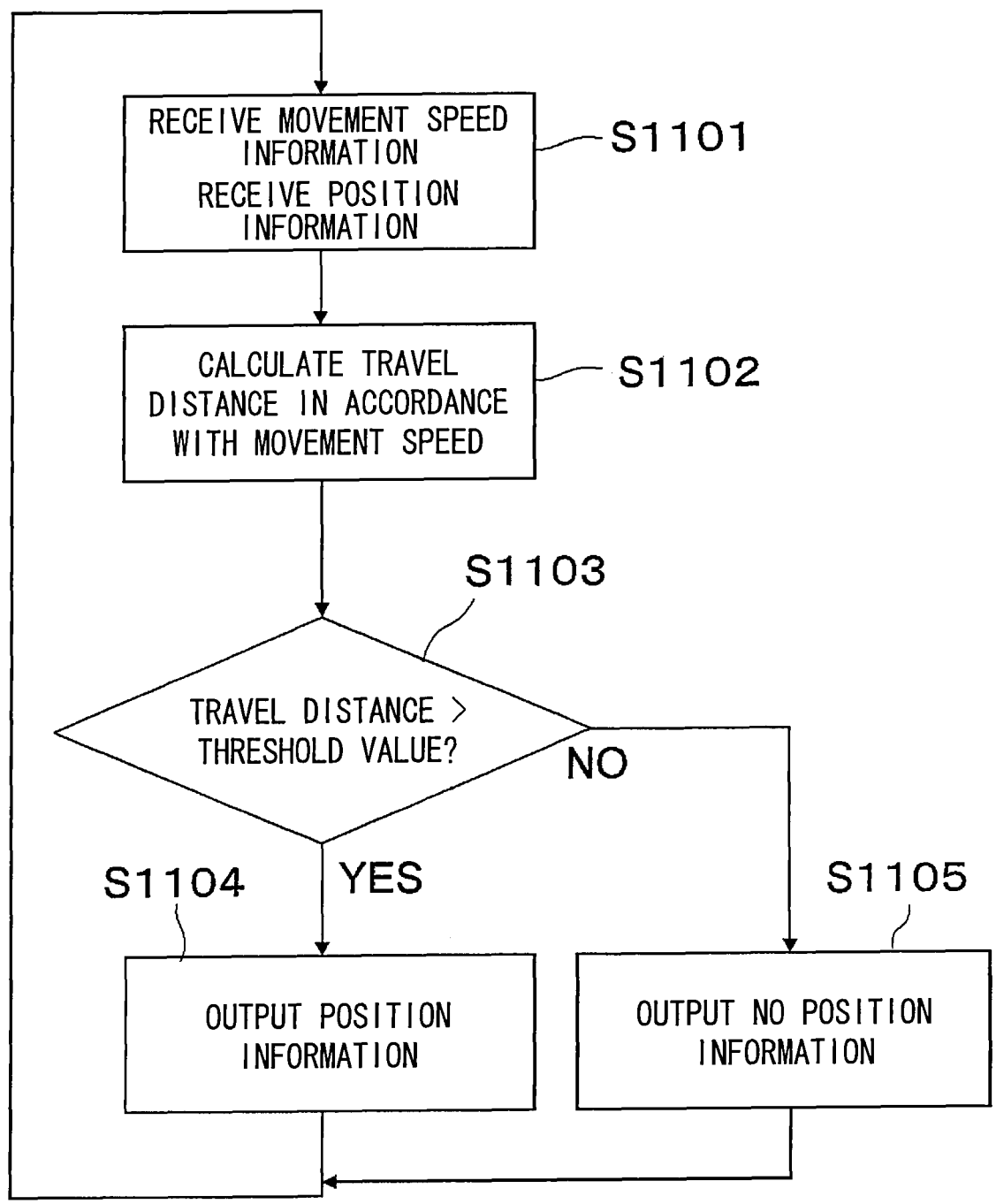
FIG. 4 is a flow chart showing the content of data processing in a preprocessing section 803.

FIG. 4 is a flow chart showing the content of data processing in the preprocessing section 803. An explanation is given with reference to FIG. 4. When the process is started, first, in Step S1101, the preprocessing section 803 receives movement speed information 811 on a moving body from the movement speed measuring means 801 and receives position information 110 from the position measuring means 102. In Step S1101, the position information 101 thus received is accumulated in a storage device for future use. Next, in Step S1102, the preprocessing section 803 time-integrates movement speeds of the moving body in accordance with the movement speed information 811 and calculates a travel distance that the moving body has traveled since the last output of position information. Next, in Step S1103, the preprocessing section 803 determines whether or not the travel distance thus calculated is greater than or equal to a predetermined threshold value. If the travel distance is greater than the predetermined threshold value, the preprocessing section 803 executes Step S1104 to output position information in accordance with the position information 101 thus received. In cases where the position information thus received has been given information on uncertainty, the preprocessing section 803 outputs position information with the least uncertainty as a preprocessing signal 812 in accordance with the recording of accumulation of previously received position information. If, in Step S1103, the preprocessing section 803 determines that the travel distance is not greater than the predetermined threshold value, the preprocessing section 803 executes Step S1105. However, the preprocessing section 803 does not produce any output, i.e., outputs information indicative of the absence of output as a preprocessing signal 812.

Figure 5:
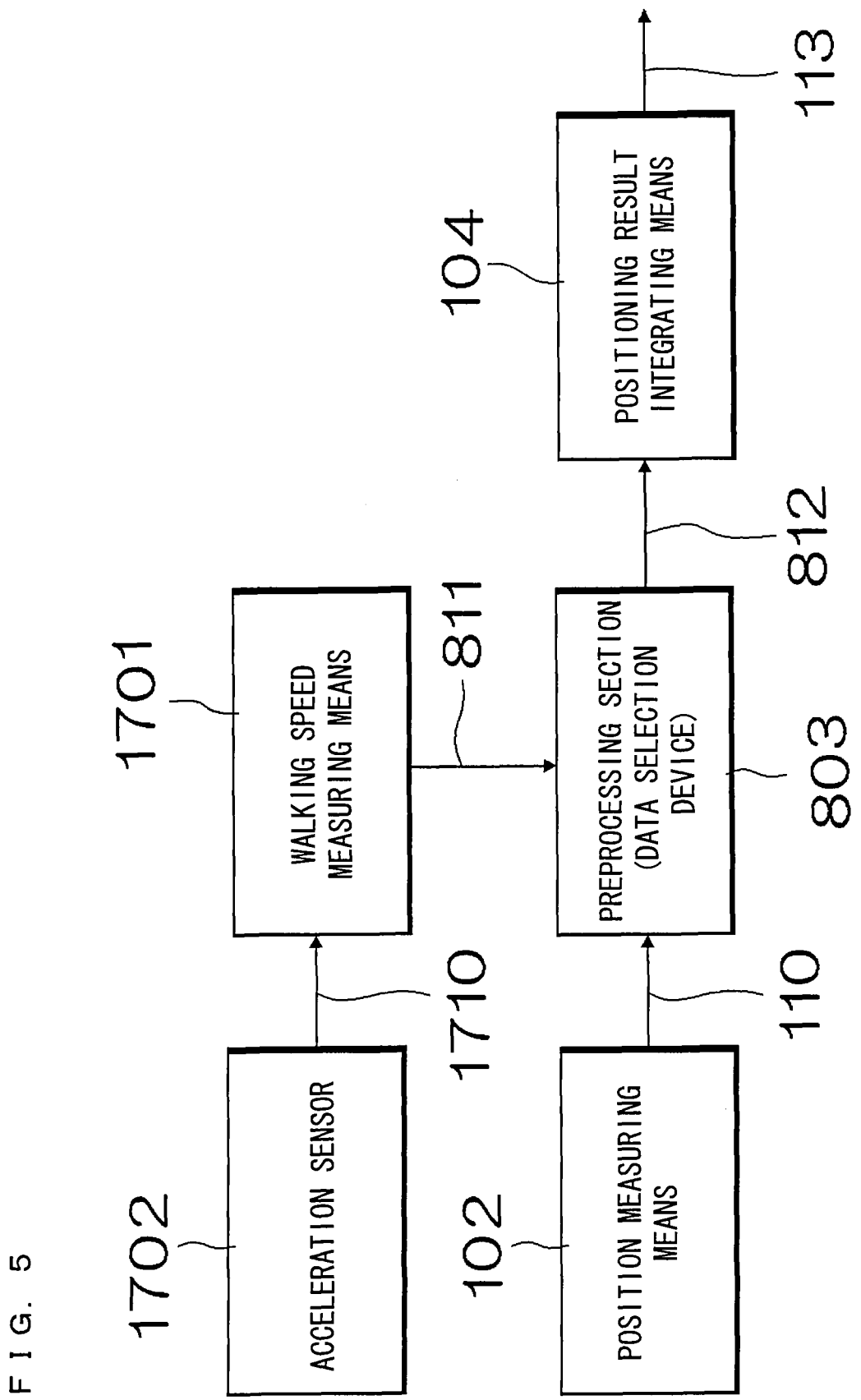
FIG. 5 is a block diagram showing a configuration of still another moving body positioning apparatus according to the present invention.

FIG. 5 is a block diagram showing a configuration of still another moving body positioning apparatus according to the present invention. In FIG. 5, reference numerals 102, 104, 1701, 1702, and 803 indicate position measuring means, positioning result integrating means, walking speed measuring means, an acceleration sensor, and a preprocessing section, respectively. Reference numerals 110, 811, 812, and 113 indicate position information, movement speed information, a preprocessing signal outputted by the preprocessing section, and an integrated signal of positioning results, respectively.

The block diagram of FIG. 5 shows a configuration of a moving body positioning apparatus for measuring a position of movement of a person. The moving body positioning apparatus includes walking speed measuring means 1701 and an acceleration sensor 1702, instead of including the movement speed measuring means 801 of FIG. 3.

That is, the moving body positioning apparatus of FIG. 5 is obtained by replacing the movement speed measuring means 801 of FIG. 3 for measuring the movement speed of a moving body with the walking speed measuring means 1701 for measuring the walking speed of a person. In this embodiment, the moving body is supposed to be a pedestrian. The walking speed measuring means 1701 calculates a walking speed by receiving acceleration output 1710 from the acceleration sensor 1702. The calculation of a walking speed based on acceleration is described in Japanese Patent Application Publication, Tokukai, No. 2005-114537, which relates to an invention of the inventors of the present invention. Other components of the moving body positioning apparatus are the same as those described with reference to FIGS. 3 and 4, and as such, as not described.

Figure 6:
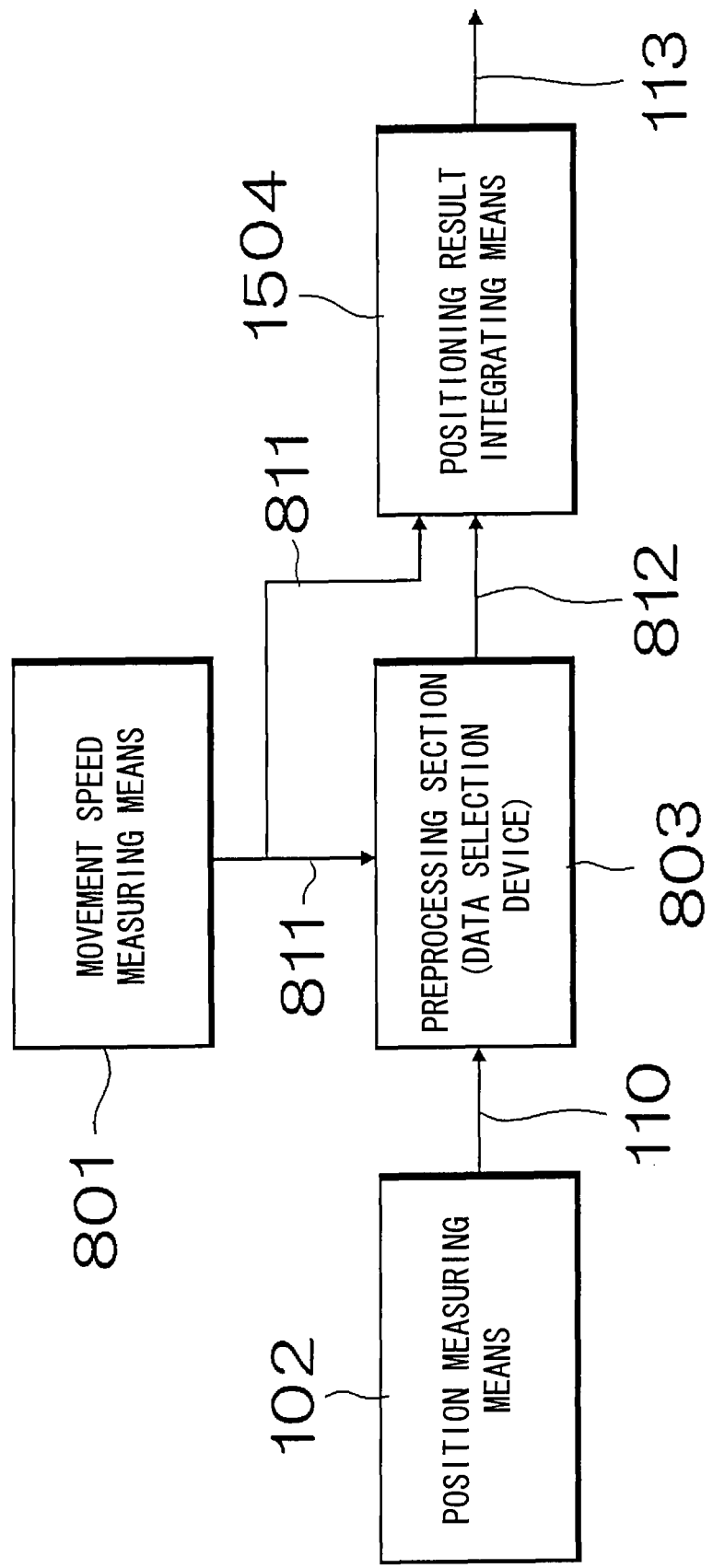
FIG. 6 is a block diagram showing a configuration of another moving body positioning apparatus according to the present invention.

FIG. 6 is a block diagram showing a configuration of another moving body positioning apparatus according to the present invention obtained by configuring the moving body positioning apparatus of FIG. 3 such that the movement speed of a moving body as measured by the movement speed measuring means 801 is inputted into positioning result integrating means 1504. In FIG. 6, reference numerals 102, 1504, 801, and 803 indicate position measuring means, positioning result integrating means, movement speed measuring means, and a preprocessing section, respectively. Reference numerals 110, 811, 812, and 113 indicate position information, movement speed information, a preprocessing signal outputted by the preprocessing section, and an integrated signal of positioning results, respectively.

The movement speed measuring means 801 here is means for measuring the movement speed of a moving body, as with the movement measuring means 801 of FIG. 3. In the moving body positioning apparatus thus configured, the movement speed measuring means 801 not only outputs movement speed information 811 on a moving body as input into the preprocessing section 803, which carries out a data selection process, but also outputs movement speed information 811 as direct input into the positioning result integrating means 1504. The positioning result integrating means 1504 is integrating means for integrally processing positioning results and, at the same time, is configured to be able to use a movement speed to update its internal state and embodied, for example, by a configuration of a Kalman filter which can be used for observation to update its internal state. Functions of the position measuring means 102, which measures the position of a moving body, and the preprocessing section 803 are the same as those described with reference to FIG. 3.

Figure 7:
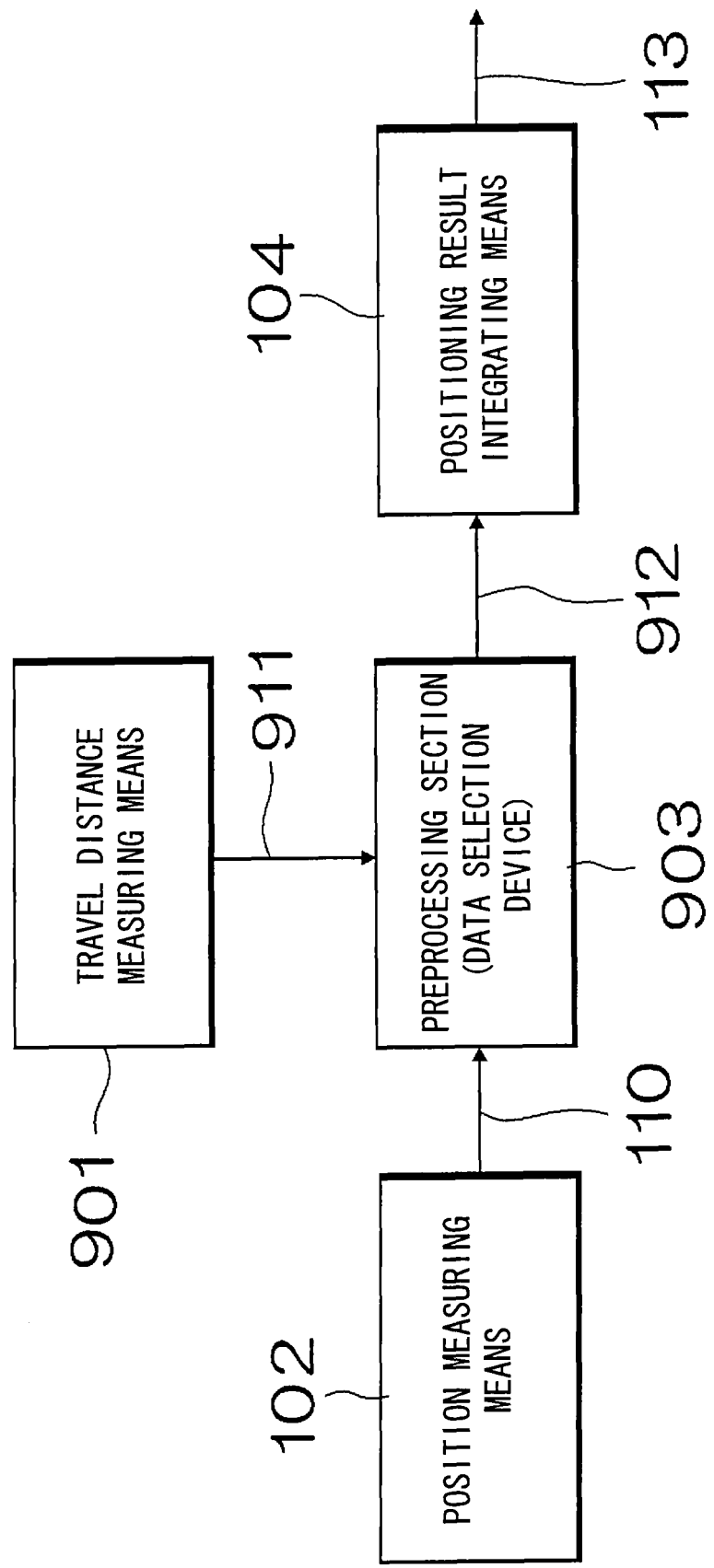
FIG. 7 is a block diagram showing a configuration of another moving body positioning apparatus according to the present invention.

FIG. 7 is a block diagram showing a configuration of another moving body positioning apparatus according to the present invention. In FIG. 7, reference numerals 102, 104, 901, and 903 indicate position measuring means, positioning result integrating means, travel distance measuring means, and a preprocessing section, respectively. Reference numerals 110, 911, 912, and 113 indicate position information, travel distance information, a preprocessing signal outputted by the preprocessing section, and an integrated signal of positioning results, respectively.

In the block diagram of FIG. 7, the moving body positioning apparatus includes travel distance measuring means 901 for measuring a travel distance that a moving body has traveled, instead of including the movement detecting means 701. The travel distance measuring means 901 used here is measuring means for measuring and outputting a relative travel distance. For example, the travel distance measuring means 901 can be embodied by a measuring device capable of obtaining a relative travel distance by using a difference between positioning results obtained by the GPS. Alternatively, in cases where the moving body is an automobile, the travel distance measuring means 901 can be embodied by a measuring device that obtains output of a travel distance from the radius of each wheel by a car speed pulse or a wheel rotary encoder. Alternatively, the same output can be obtained by a device (e.g., an inertial navigation system) that calculates a relative travel distance by integrating movement speeds. Alternatively, in cases where the moving body is a pedestrian, the travel distance measuring means 901 can be embodied by a measuring device using a technique capable of acquiring a travel distance from the length of stride of a pedestrian and output of an acceleration sensor.

The travel distance measuring means 901 outputs relative travel distance information 911. The position measuring means 102 measures the position of a moving body and outputs position information 110 on the moving body. Such position information 110 thus outputted may contain the uncertainty of the position information. The preprocessing section 903 receives position information 110 from the position measuring means 102, and outputs first received position information 110 as a preprocessing signal 912. In cases where the preprocessing section 903 outputted position information 110 in the past, the preprocessing section 903 calculates a distance that the moving body has traveled from a reference position at which the last position information 110 was outputted. If the distance thus calculated is less than or equal to a predetermined threshold value, the preprocessing section 903 selects one of the pieces of previously received position information 110 as a representative value and outputs it as a preprocessing signal 912. As with the aforementioned configuration, the positioning result integrating means 104 integrates a plurality of positioning results of the moving body into one final positioning result and outputs it.

Figure 8:
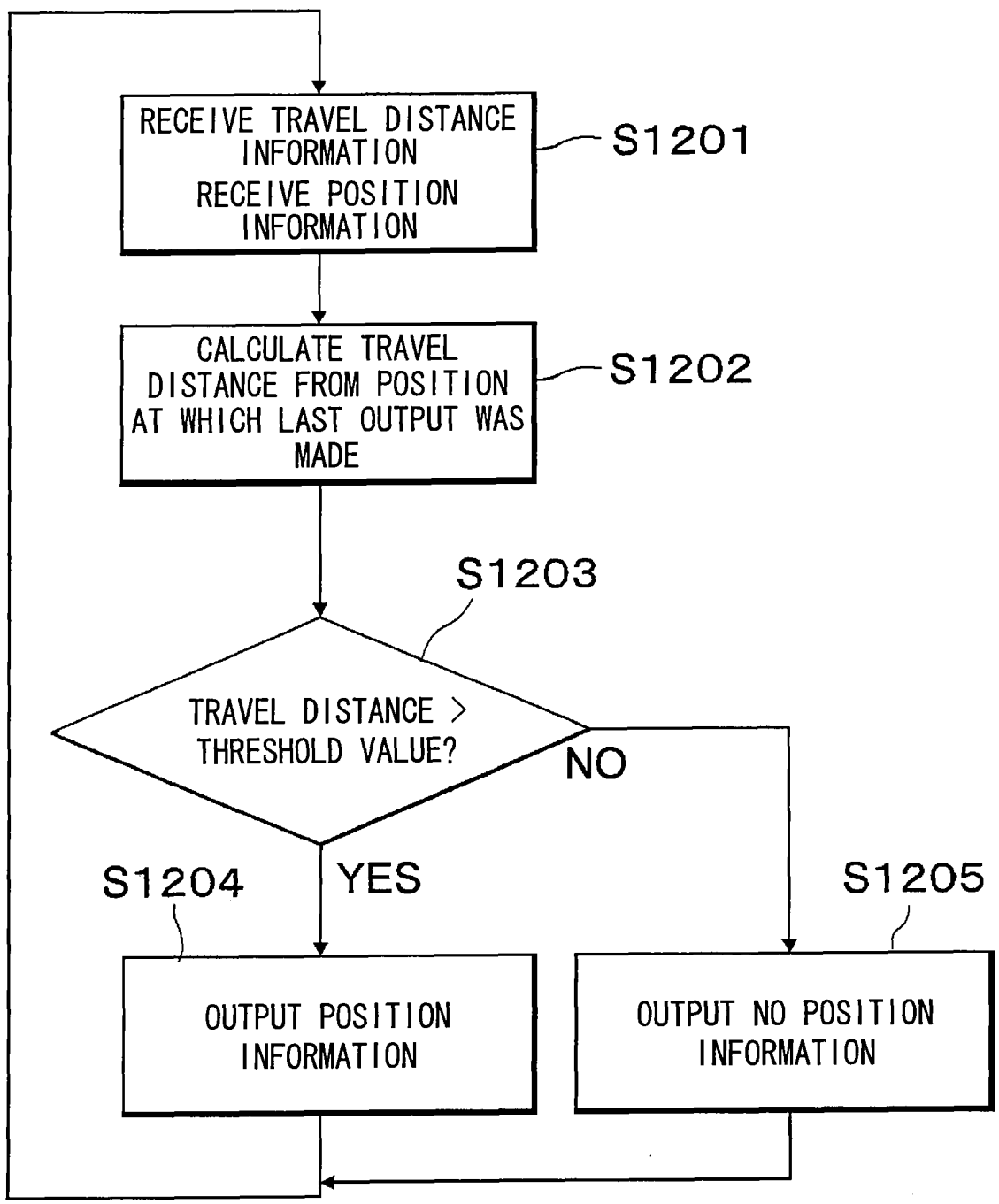
FIG. 8 is a flow chart showing the content of data processing in a preprocessing section 903.

FIG. 8 is a flow chart showing the content of data processing the preprocessing section 903. An explanation is given with reference to FIG. 8. When the process is started, first, in Step S1201, the preprocessing section 903 receives travel distance information 911 on a moving body from the travel distance measuring means 901 and receives position information 110 from the position measuring means 102. In Step S1201, the position information 101 thus received is accumulated in a storage device for future use. Next, in Step S1202, the preprocessing section 903 calculates a travel distance that the moving body has traveled from a position at which the previous position information was outputted.

Next, in Step S1203, the preprocessing section 903 determines whether or not the travel distance thus calculated is greater than a predetermined threshold value. If the travel distance is greater than the predetermined threshold value, the preprocessing section 903 executes Step S1204 to output position information in accordance with the position information thus received. In cases where the position information thus received has been given information on uncertainty, the preprocessing section 903 outputs position information with the least uncertainty as a preprocessing signal 912 in accordance with the recording of accumulation of previously received position information. If, in Step S1203, the preprocessing section 803 determines that the travel distance is not greater than the predetermined threshold value, the preprocessing section 903 executes Step S1205. However, the preprocessing section 903 does not output any position information, i.e., outputs information indicative of the absence of output as a preprocessing signal 912.

Figure 9:
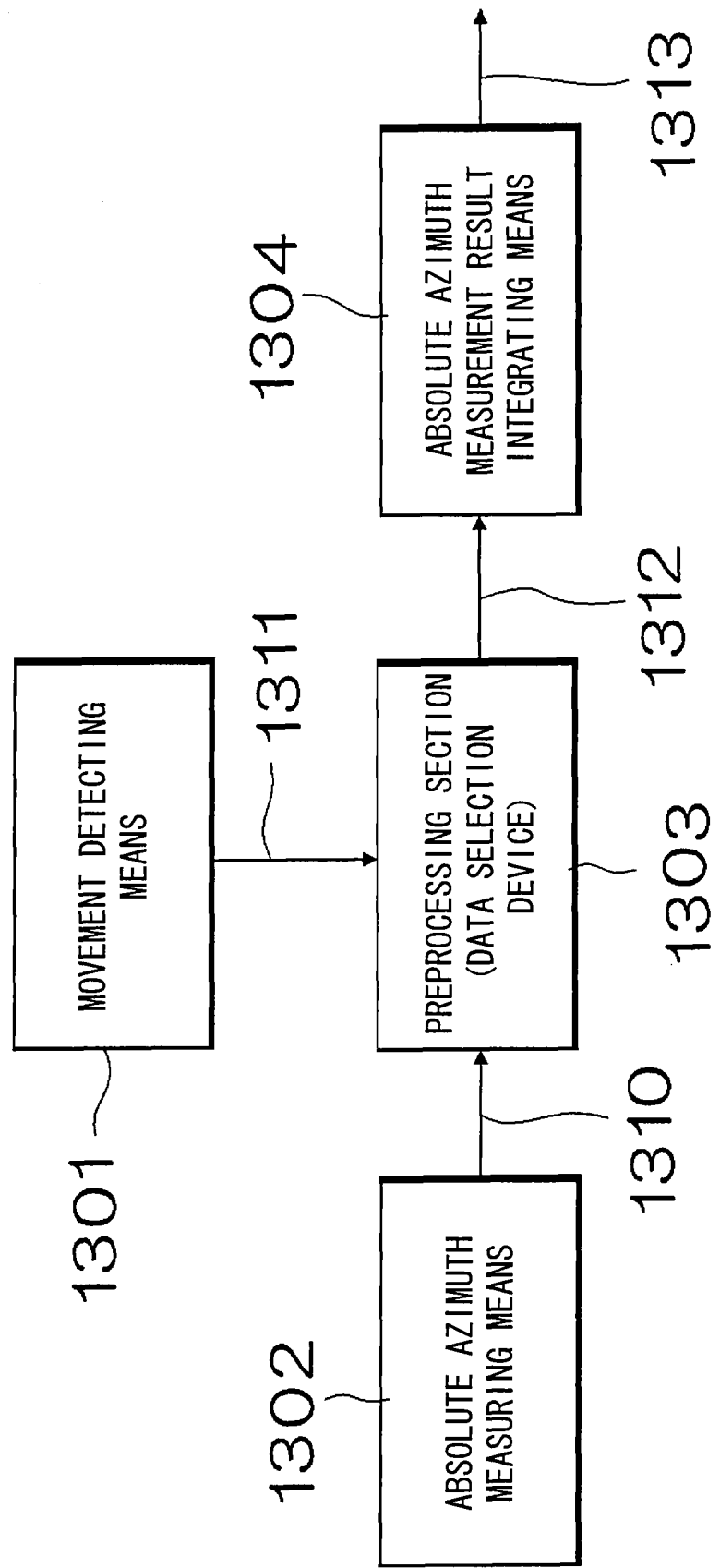
FIG. 9 is a block diagram showing a configuration of another moving body positioning apparatus according to the present invention.

FIG. 9 is a block diagram of a configuration of another moving body positioning apparatus according to the present invention. In FIG. 9, reference numerals 1302, 1304, 1301, and 1303 indicate absolute azimuth measuring means, absolute azimuth measurement result integrating means, movement detecting means, and a preprocessing section, respectively. Reference numerals 1310, 1311, 1312, and 1313 indicate absolute azimuth measurement information, a movement detection signal, a preprocessing signal outputted by the preprocessing section, and an integrated signal of positioning results, respectively.

The movement detecting means 1301 is a measuring device mounted to a moving body or a measuring device that observes a moving body from outside. This device is identical to the movement detecting means 701 of the configuration described with reference to FIG. 1. When the moving body is moving, the movement detecting means 1301 outputs a movement detection signal 1311 whose movement flag is TRUE. Alternatively, when the moving body is at rest, the movement detecting means 1301 outputs a movement detection signal 1311 whose movement flag is FALSE. The absolute azimuth measuring means 1302 is a measuring device that measures and outputs the azimuth angle of a moving body. The absolute azimuth measuring means 1302 is embodied, for example, by an electronic compass (combination of a magnetic sensor and an acceleration sensor), etc.

The preprocessing section 1303, which carries out a data selection process, receives a movement detection signal 1311 from the movement detecting means 1301 and receives absolute azimuth measurement information 1310 from the absolute azimuth measuring means 1302. The absolute azimuth measurement information 1310 may contain uncertainty about the absolute azimuth. When the movement detection signal 1311, which is a signal that indicates whether or not the moving body is moving, is a FALSE movement flag, i.e., when it is determined that the moving body is at rest, the preprocessing section 1303 carries out a process of skipping second and subsequent pieces of absolute azimuth input 1310.

Alternatively, when the movement detection signal 1311 is TRUE, i.e., when it is determined that the moving body is moving, the preprocessing section 1303 selects a representative one of plural pieces of input of absolute azimuth measurement information 1310 observed when the moving body was at rest. When the pieces of absolute azimuth measurement information 1310 contain information about uncertainty, the preprocessing section 1303 selects out absolute azimuth with the least uncertainty.

The absolute azimuth measurement result integrating means 1304 receives measurement results from a plurality of absolute azimuth measuring means 1302, integrates the measurement results into one final absolute azimuth estimate result, and outputs the final absolute azimuth estimate result as an integrated signal 1313. The plurality of absolute azimuth measuring means 1302 can be embodied, for example, by means for integrating signals obtained by gyro sensor (angular velocity sensor) to measure a relative azimuth angle with respect to a reference azimuth angle. The absolute azimuth measurement result integrating means 1304, which integrates these estimate results, can be constituted, for example, by a Kalman filter, a particle filter, etc. The absolute azimuth measurement result integrating means 1304 receives the absolute azimuth selected by the preprocessing section 1303, i.e., receives a preprocessing signal 1312 from the preprocessing section 1303, updates its internal state, and outputs a final absolute azimuth estimate result 1313 in accordance with input from the other absolute azimuth measuring means and its internal state.

Figure 10:
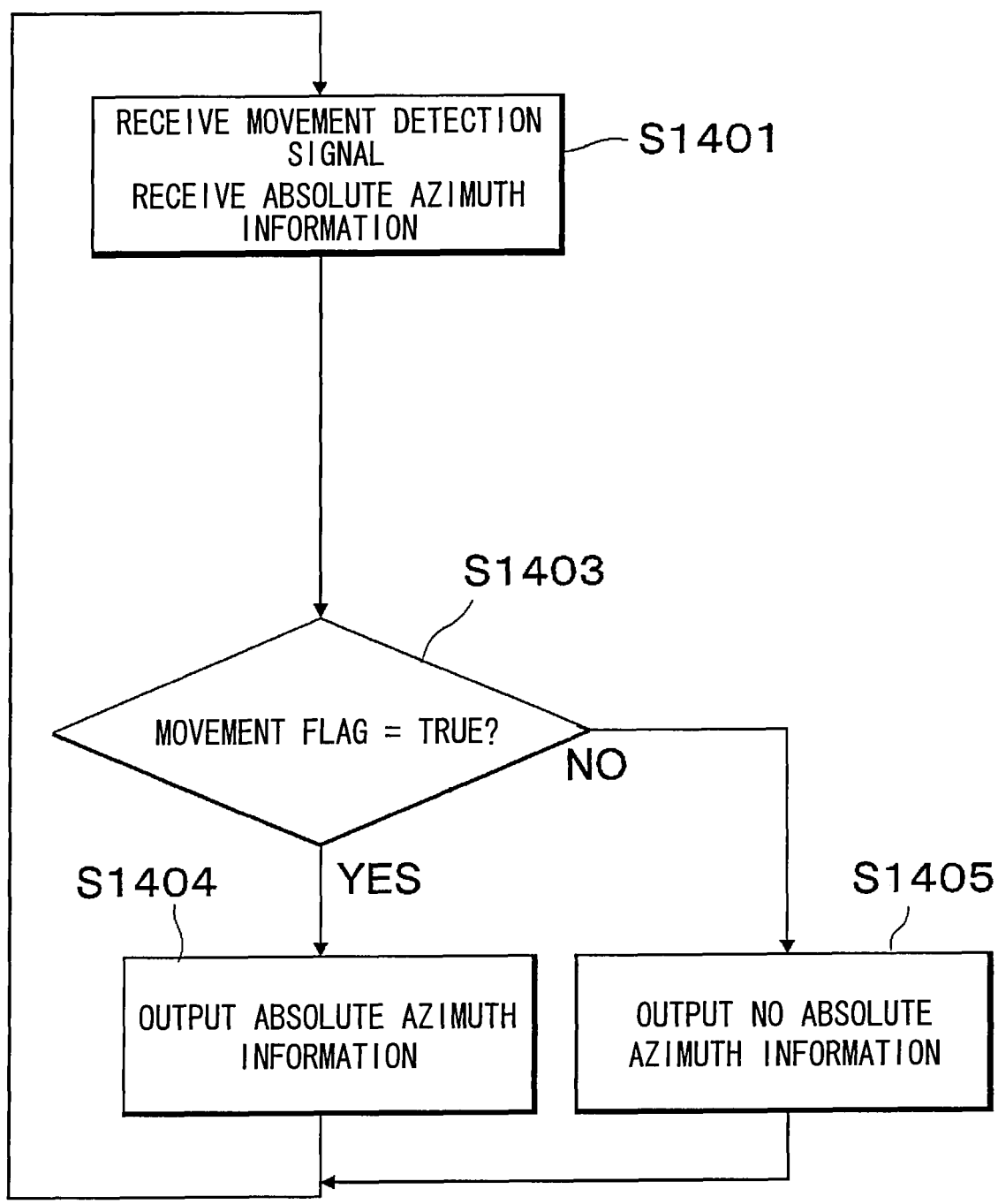
FIG. 10 is a flow chart showing the content of data processing in a preprocessing section 1303.

FIG. 10 is a flow chart showing the content of data processing in the preprocessing section 1303. An explanation is given with reference to FIG. 10. When the process is started, first, in Step S1401, the preprocessing section 1303 receives from the movement detecting means 1301 a movement detection signal 1311 representing whether or not the moving body is moving and receives absolute azimuth measurement information 1310 from the absolute azimuth measuring means 1302. The absolute azimuth 1310 here may contain information on its uncertainty. Next, in Step S1403, the preprocessing section 1303 determines whether or not the movement detection signal 311 has a TRUE movement flag. If the movement detection signal 1311 has a TRUE movement flag, the preprocessing section 1303 executes Step S1404. Alternatively, if the movement detection signal 1311 has a FALSE movement flag, the preprocessing section 1303 executes Step S1405. In Step S1404, the preprocessing section 1303 outputs absolute azimuth information as a preprocessing signal 1312. In Step S1405, the preprocessing section 1303 notifies that it does not output any absolute azimuth information as a preprocessing signal 1312. Then, the process returns to Step S1401 to start all over again from Step S1401.

Figure 11:
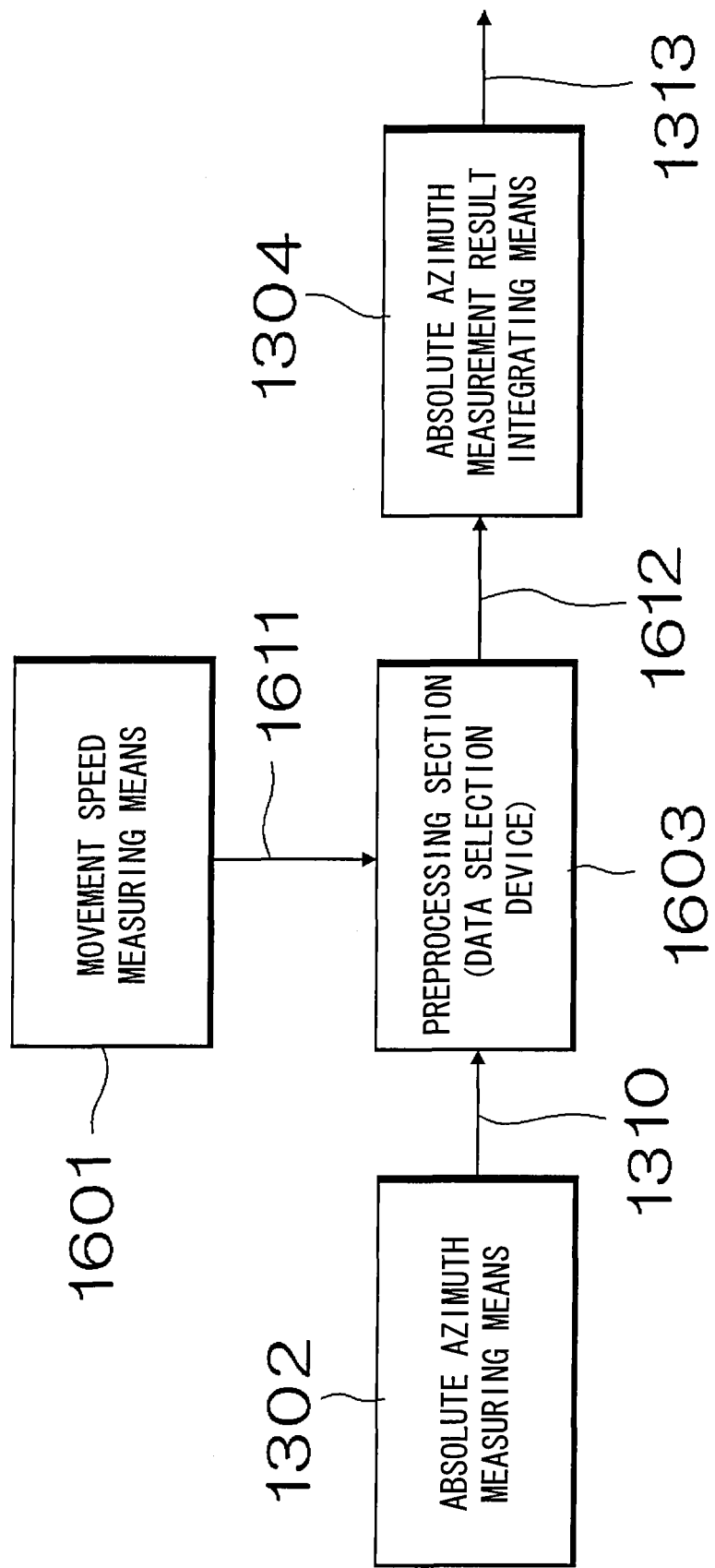
FIG. 11 is a block diagram showing a configuration of another moving body positioning apparatus according to the present invention.

FIG. 11 is a block diagram of a configuration of another moving body positioning apparatus according to the present invention. In FIG. 11, reference numerals 1602, 1304, 1601, and 1603 indicate absolute azimuth measuring means, absolute azimuth measurement result integrating means, movement speed measuring means, and a preprocessing section, respectively. Reference numerals 1310, 1611, 1612, and 1313 indicate absolute azimuth measurement information, movement speed measurement information, a preprocessing signal outputted by the preprocessing section, and an integrated signal of positioning results, respectively.

The movement speed measuring means 1601 is a device that either is mounted to a moving body or uses external observing means to measure the speed of the moving body and output movement speed measurement information 1611. In cases where the moving body is an automobile, the movement speed measuring means 1601 is embodied by a wheel rotary encoder or a car speed pulse (odometer). Alternatively, in cases where the moving body is a pedestrian, the movement speed measuring means 1601 is constituted using an acceleration sensor that detects the walking movement of the pedestrian, as proposed by the inventors of the present invention in their previous patent application. Alternatively, the movement speed measuring means 1601 can be embodied by a device that measures the movement speed of a moving body by analyzing an image taken by a camera installed outside to monitor the moving body. Alternatively, the movement speed measuring means 1601 can principally measure the movement speed of any moving body by using an inertial navigation system (INS).

As mentioned above, the absolute azimuth measuring means 1302 is a device that measures and outputs the azimuth angle of a moving body. The absolute azimuth measuring means 1302 can be embodied, for example, by an electronic compass (combination of a magnetic sensor and an acceleration sensor). The preprocessing section 1603 receives movement speed measurement information 1611 and integrates it to calculate a travel distance. If the travel distance thus calculated is greater than or equal to a predetermined threshold value, the preprocessing section 1603 outputs absolute azimuth information 1310 as a preprocessing signal 1612. Further, if the absolute azimuth information 1310 has been given information on uncertainty, the preprocessing section 1603 outputs absolute azimuth information 1310 with the least uncertainty. If the travel distance thus calculated is not greater than the predetermined threshold value, the preprocessing section 1603 does not output any absolute azimuth information 1310. The absolute azimuth measurement result integrating means 1304 receives measurement results from a plurality of absolute azimuth measuring means, integrates the measurement results into one final absolute azimuth estimate result, and outputs the final absolute azimuth estimate result as an integrated signal 1313. The absolute azimuth measurement result integrating means 1304 is the same device as that described with reference to FIG. 7.

Figure 12:
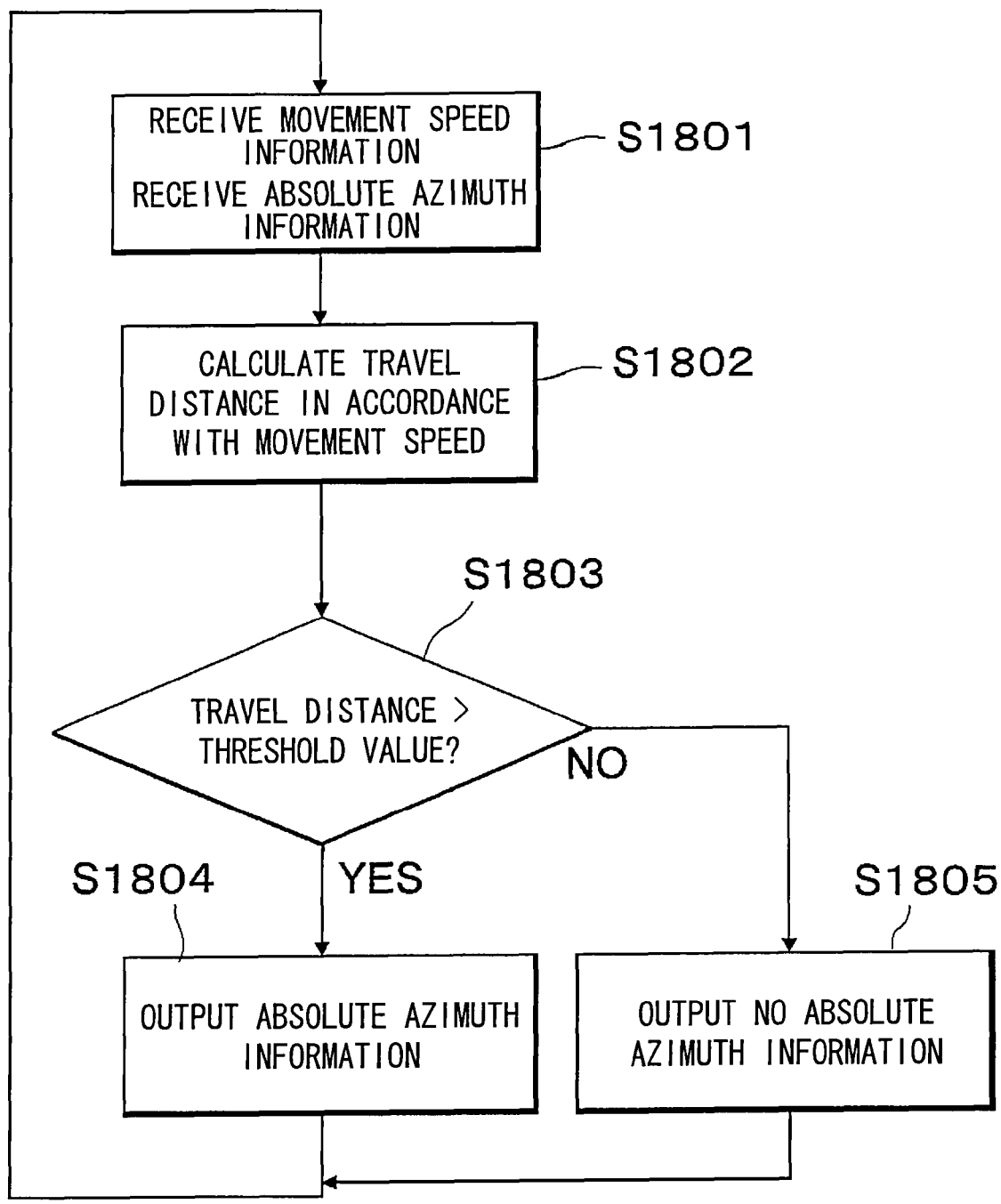
FIG. 12 is a flow chart showing the content of data processing in a preprocessing section 1603.

FIG. 12 is a flow chart showing the content of data processing in the preprocessing section 1603. An explanation is given with reference to FIG. 12. When the process is started, first, in Step S1801, the preprocessing section 1603 receives movement speed measurement information 1611 on a moving body from the movement speed measuring means 1601 and receives absolute azimuth information 1310 from the absolute azimuth measuring means 1302. Next, in Step S1802, the preprocessing section 1603 time-integrates movement speeds as movement speed measurement information 1611 to calculate a travel distance. Next, in Step S1803, the preprocessing section 1603 determines whether or not the travel distance thus calculated is greater than a predetermined threshold value. If the travel distance is greater than the predetermined threshold value, the preprocessing section 1603 proceeds to Step S1804. Alternatively, if the travel distance is less than or equal to the predetermined threshold value, the preprocessing section 1603 proceeds to Step S1805. In Step S1804, the preprocessing section 1603 outputs received absolute azimuth information 1310 as a preprocessing signal 1612. At the same time, the preprocessing section 1603 resets to zero the distance that is used in calculating the travel distance. In Step S1805, the preprocessing section 1603 does not output any absolute azimuth information and notifies the absence of output.

Figure 13:
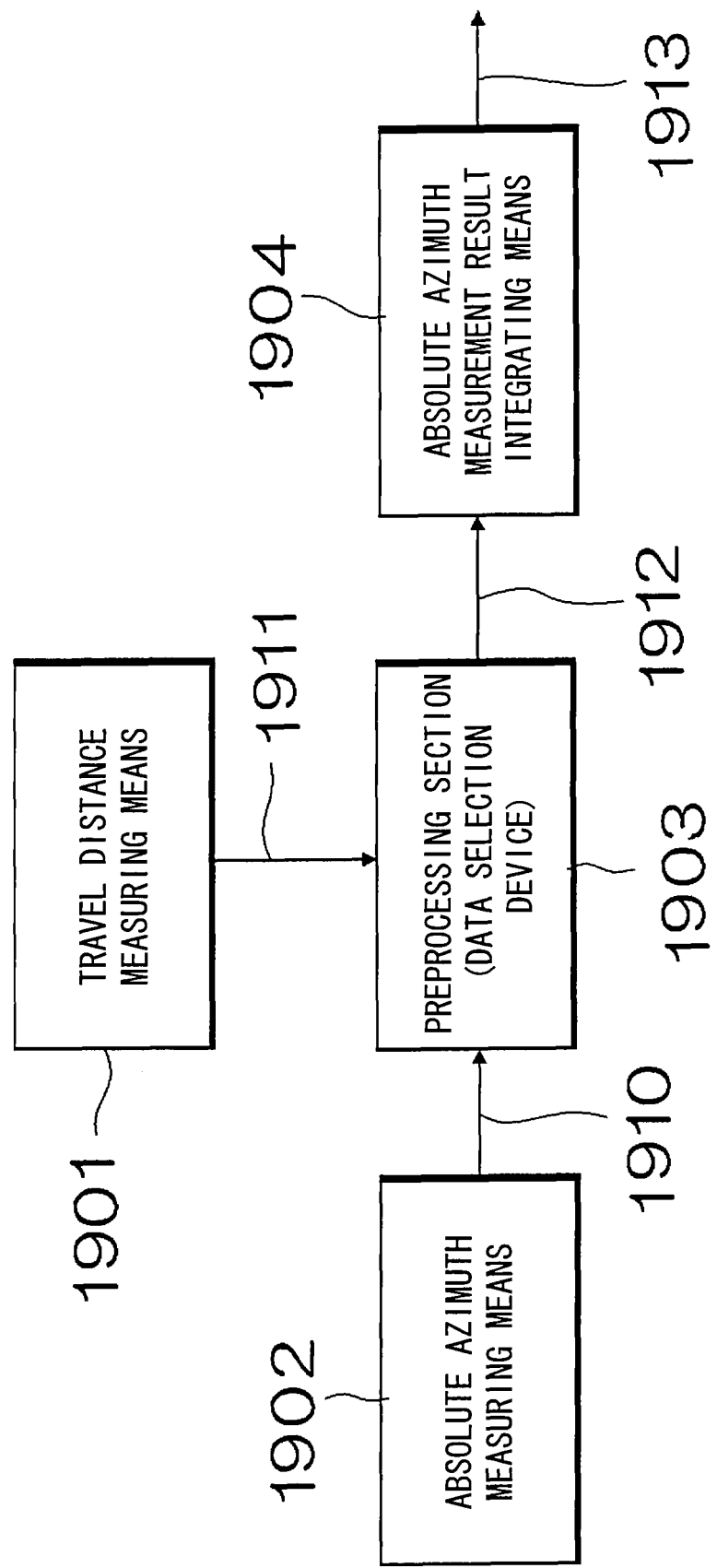
FIG. 13 is a block diagram showing a configuration of another moving body positioning apparatus according to the present invention.

FIG. 13 is a block diagram of a configuration of another moving body positioning apparatus according to the present invention. In FIG. 13, reference numerals 1902, 1904, 1901, and 1903 indicate absolute azimuth measuring means, absolute azimuth measurement result integrating means, travel distance measuring means, and a preprocessing section, respectively. Reference numerals 1910, 1911, 1912, and 1913 indicate absolute azimuth information, travel distance information, a preprocessing signal outputted by the preprocessing section, and an integrated signal of positioning results, respectively.

In the block diagram of FIG. 13, the moving body positioning apparatus includes travel distance measuring means 901 for measuring a travel distance that a moving body has traveled, instead of including movement detecting means. The travel distance measuring means 901 used here is measuring means for measuring and outputting a relative travel distance, and is identical to the travel distance measuring means 901 described with reference to FIG. 3.

The absolute azimuth measuring means 1902 is a device that measures the absolute azimuth of a moving body, and is identical to the absolute azimuth measuring means 1302 shown in FIG. 9. The preprocessing section 1903 receives a relative travel distance as travel distance information 1911 from the travel distance measuring means 1901 and receives absolute azimuth information 1910 from the absolute azimuth measuring means 1902. When the distance from the reference position exceeds a predetermined threshold value, the preprocessing section 1903 outputs absolute azimuth information 1910 as a preprocessing signal 1912. The absolute azimuth measurement result integrating means 1904 is identical to the absolute azimuth measurement result integrating means 1304 described with reference to FIG. 9. The absolute azimuth measurement result integrating means 1904 receives input from a plurality of absolute azimuth measuring means and outputs a final absolute azimuth estimate result as an integrated signal 1913 in accordance with its internal state and the input.

Figure 14:
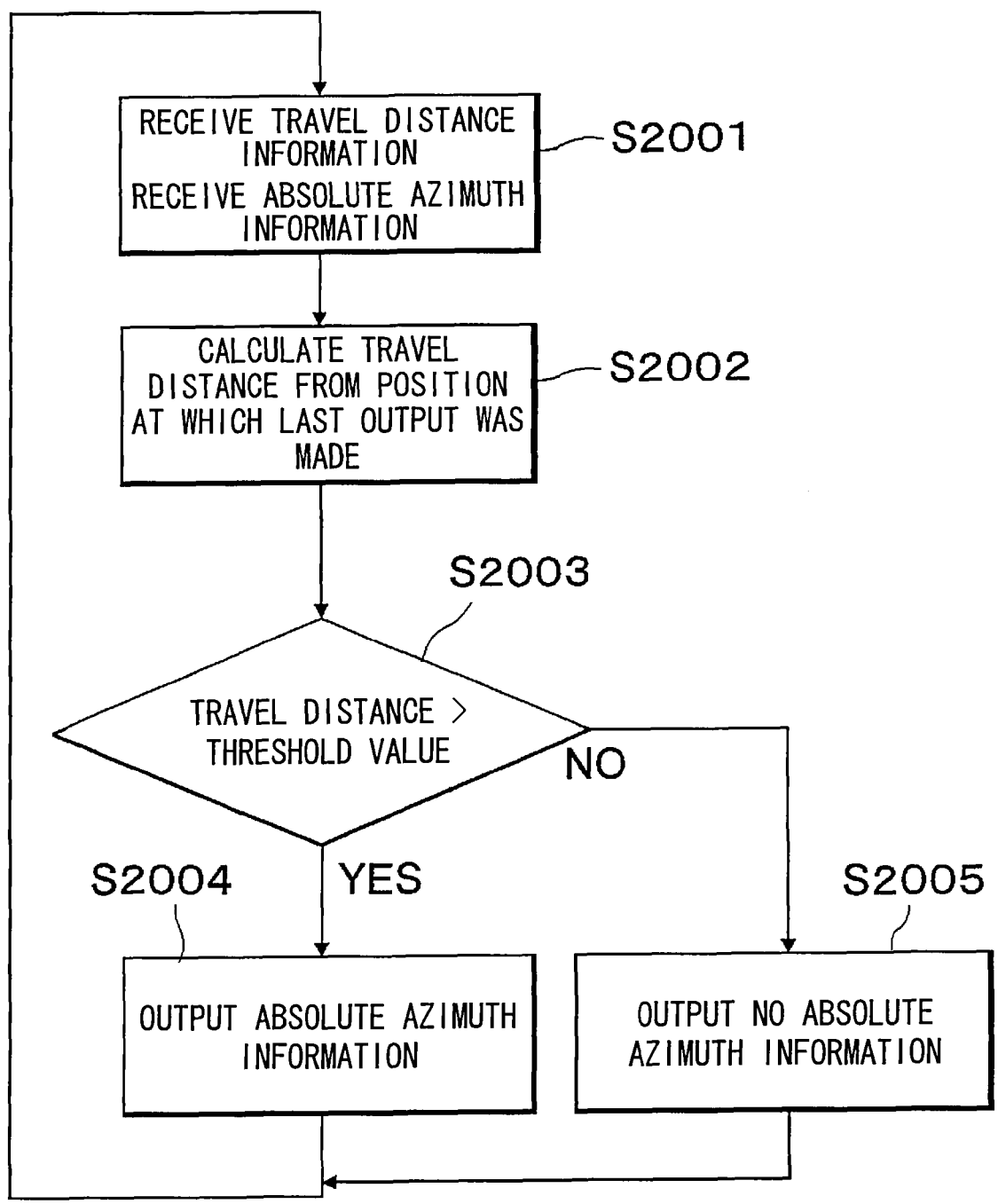
FIG. 14 is a flow chart showing the content of data processing in a preprocessing section 1903.

FIG. 14 is a flow chart showing the content of data processing in the preprocessing section 1903. An explanation is given with reference to FIG. 14. When the process is started, first, in Step S2001, the preprocessing section 1903 receives travel distance information 1911 from the travel distance measuring means 1901 and receives absolute azimuth information 1910 from the absolute azimuth measuring means 1902. Next, in Step S2002, the preprocessing section 1903 accumulates relative travel distances as travel distance information 1911 to calculate a travel distance from a reference position, i.e., a travel distance from a position at which the last absolute azimuth information 1910 was outputted. In Step S2003, the preprocessing section 1903 determines whether or not the travel distance thus calculated is greater than a predetermined threshold value. If the travel distance is greater than the predetermined threshold value, the preprocessing section 1903 executes Step S2004. If the travel distance is not greater than the predetermined threshold value, the preprocessing section 1903 executes Step S2005. In Step S2004, the preprocessing section 1903 outputs received absolute azimuth information 1310 as a preprocessing signal 1612. At the same time, the preprocessing section 1903 resets the reference position in Step S2002 to zero. In Step S2005, the preprocessing section 1903 does not output any absolute azimuth information and notifies the absence of output.

REFERENCE SIGNS LIST

102 Position measuring means
104 Positioning result integrating means
110 Position information
113 Integrated signal of positioning results
701 Movement detecting means
703 Preprocessing section
711 Movement detection signal
712 Preprocessing signal
713 Integrated signal of positioning results
801 Movement speed measuring means
803 Preprocessing section
811 Movement speed information
812 Preprocessing signal
901 Travel distance measuring means
903 Preprocessing section
911 Travel distance information
1301 Movement detecting means
1302 Absolute azimuth measuring means
1303 Preprocessing section
1304 Absolute azimuth positioning result integrating means
1310 Absolute azimuth information
1311 Movement detection signal
1312 Preprocessing signal
1313 Integrated signal of positioning results
1504 Positioning result integrating means
1601 Movement speed measuring means
1602 Absolute azimuth measuring means
1603 Preprocessing section
1611 Movement speed measurement information
1612 Preprocessing signal from preprocessing section
1701 Walking speed measuring means
1901 Travel distance measuring means
1902 Absolute azimuth measuring means
1903 Pro-processing section
1904 Absolute azimuth positioning result integrating means
1910 Absolute azimuth information
1911 Travel distance information
1912 Preprocessing signal
1913 Integrated signal of positioning results

The invention claimed is:

1. A moving body positioning apparatus comprising:
a section for detecting or measuring any of (i) whether or not a moving body is moving, (ii) a movement speed of the moving body, and (iii) a travel distance that the moving body has traveled;
a position acquiring section for acquiring a plurality of positions of the moving body as positioning results;
a processor configured to integrally process the positioning results inputted therein; and
a processor configured to preprocess the positioning results that are to be inputted into the processor configured to integrally process,
the processor configured to preprocess inputting the positioning results obtained from the position acquiring section into the processor configured to integrally process based on output from the section for detecting or measuring, wherein
a first state in which the moving body is moving is distinguished from a second state in which the moving body is not moving by the processor configured to preprocess;
a data processing of the positioning results performed in the second state is different from a data processing of the positioning results performed in the first state,
wherein, in the second state, the processor configured to preprocess presents an information indicative of an absence of an output; and
depending on whether the moving body is moving or not, a positioning result, which needs adjustment, is selected,
wherein based on the detected or measured any one of (i), (ii), or (iii), the travel distance that the moving body has traveled is determined, and when the determined travel distance is less than or equal to a predetermined threshold value, the processor configured to preprocess selects one of the positioning results, previously received, as a representative value inputted to the processor configured to integrally process.

2. A moving body positioning apparatus comprising:
a movement speed measuring section for measuring a movement speed of a moving body as measurement results;
a position acquiring section for acquiring a plurality of positions of the moving body as positioning results;
a processor configured to integrally process the positioning results and measuring results inputted therein; and
a processor configured to preprocess the positioning results that are to be inputted into the processor configured to integrally process,
the processor configured to preprocess inputting the positioning results obtained from the position acquiring section into the processor configured to integrally process based on output from the movement speed measuring section, wherein
a first state in which the moving body is moving is distinguished from a second state in which the moving body is not moving by the processor configured to preprocess;
a data processing of the positioning results performed in the second state is different from a data processing of the positioning results performed in the first state,
wherein, in the second state, the processor configured to preprocess presents an information indicative of an absence of an output; and
depending on whether the moving body is moving or not, a positioning result, which needs adjustment, is selected,
wherein when a travel distance, which the moving body has traveled since a most recent output, is less than or equal to a predetermined threshold value, the processor configured to preprocess selects one of the positioning results, previously received, as a representative value.

3. A moving body positioning apparatus comprising:
a section for detecting or measuring any of (i) whether or not a moving body is moving, (ii) a movement speed of the moving body, and (iii) a travel distance that the moving body has traveled;
an absolute azimuth acquiring section for acquiring an absolute azimuth of the moving body;
a processor configured to integrally process azimuth of the moving body estimate results estimated from a plurality of absolute azimuths of the moving body acquired by the absolute azimuth acquiring section as orienting results; and
a processor configured to acquire positioning results and preprocess the positioning results that are to be inputted into the processor configured to integrally process,
the processor configured to acquire positioning results and preprocess the positioning results inputting absolute azimuth of the moving body estimate results obtained from the absolute azimuth acquiring section into the processor configured to integrally process based on output from the section for detecting or measuring, wherein a first state in which the moving body is moving is distinguished from a second state in which the moving body is not moving by the processor configured to acquire positioning results and preprocess the positioning results, a data processing performed in the second state is different from a data processing performed in the first state, wherein, in the first state, the processor configured to acquire positioning results and preprocess the positioning results selects one of the absolute azimuth of the moving body estimate results as a representative; and in the second state, the processor configured to acquire positioning results and preprocess the positioning results presents a notification indicative of an absence of an output.

4. The moving body positioning apparatus as set forth in claim 1, wherein position information acquired by the position acquiring section is a position information which does not necessarily have a white-noise error characteristic with a mean vector of zero.

5. The moving body positioning apparatus as set forth in claim 3, wherein azimuth information acquired by the absolute azimuth acquiring section is an azimuth information which does not necessarily have a white-noise error characteristic with a mean vector of zero.

6. The moving body positioning apparatus as set forth in claim 1, wherein the section for detecting or measuring any of (i) whether or not a moving body is moving, (ii) a movement speed of the moving body, and (iii) a travel distance that the moving body has traveled is a movement detecting section for detecting whether or not the moving body is moving.

7. The moving body positioning apparatus as set forth in claim 1, wherein the section for detecting or measuring any of (i) whether or not a moving body is moving, (ii) a movement speed of the moving body, and (iii) a travel distance that the moving body has traveled is a movement speed measuring section for measuring the movement speed of the moving body.

8. The moving body positioning apparatus as set forth in claim 1, wherein the section for detecting or measuring any of (i) whether or not a moving body is moving, (ii) a movement speed of the moving body, and (iii) a travel distance that the moving body has traveled is a travel distance measuring section for measuring the travel distance that the moving body has traveled.

9. The moving body positioning apparatus as set forth in claim 3, wherein the section for detecting or measuring any of (i) whether or not a moving body is moving, (ii) a movement speed of the moving body, and (iii) a travel distance that the moving body has traveled is a movement detecting section for detecting whether or not the moving body is moving.

10. The moving body positioning apparatus as set forth in claim 3, wherein the section for detecting or measuring any of (i) whether or not a moving body is moving, (ii) a movement speed of the moving body, and (iii) a travel distance that the moving body has traveled is a movement speed measuring section for measuring the movement speed of the moving body.

11. The moving body positioning apparatus as set forth in claim 3, wherein the section for detecting or measuring any of (i) whether or not a moving body is moving, (ii) a movement speed of the moving body, and (iii) a travel distance that the moving body has traveled is a travel distance measuring section for measuring the travel distance that the moving body has traveled.

* * * * *